Figure 1:
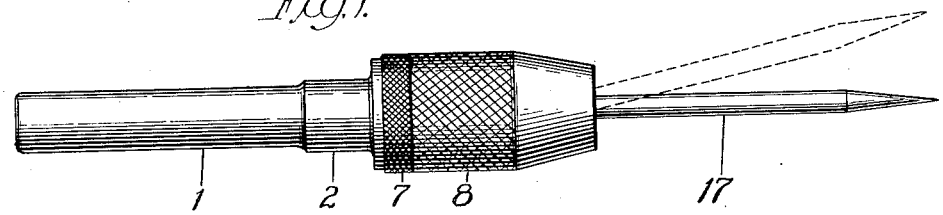

R. COOPER.
WIGGLER.
APPLICATION FILED SEPT. 20, 1913.

1,109,625.

Patented Sept. 1, 1914.

Witnesses:
E. R. Barrett.
Karel H. Butler

Inventor,
Robert Cooper,
by Barthof Barthof
Attys

UNITED STATES PATENT OFFICE.

ROBERT COOPER, OF DETROIT, MICHIGAN.

WIGGLER.

1,109,625.   Specification of Letters Patent.   Patented Sept. 1, 1914.

Application filed September 20, 1913. Serial No. 790,853.

*To all whom it may concern:*

Be it known that I, ROBERT COOPER, a subject of the King of Great Britain, residing at Detroit, in the county of Wayne and State of Michigan, have invented certain new and useful Improvements in Wigglers, of which the following is a specification, reference being had therein to the accompanying drawings.

This invention relates to a milling machine wiggler and drill chuck, and more particularly to a machinist's tool for expeditiously and accurately centering a piece of work whereby it can be properly drilled and operated upon.

It is usual to mark the center of a hole to be drilled with a center punch and enter the point of the drill in the mark or indentation so made. A common way of securing accuracy is to adjust a pair of compasses to the radius of the drill, then after the center is pricked on the metal to be drilled to mark a circle equal to the circumference of the drill around said center with the compasses. The metal is often chalked so that the circle may be marked thereon and easily observed.

To determine when a piece of work is properly centered in a machine, after the work has once been laid out, I have devised a simple and inexpensive tool wherein positive and reliable means are employed, as hereinafter set forth, for holding a needle point or wiggler in the center punch mark or if desired in any adjusted position, whereby a circle may be quickly described in proximity to the surface of a piece of work to be operated upon or if centered in the punch mark the degree of wabbling will indicate the extent that the work is out of line.

My invention further aims to provide a milling machine wiggler with an invertible needle or indicator that can be housed within the holder whereby the device can be safely carried in a grip or in the pocket.

The above and other objects are accomplished by a mechanical construction that will be hereinafter specifically described and then claimed.

Reference will now be had to the drawing, wherein—

Figure 2:
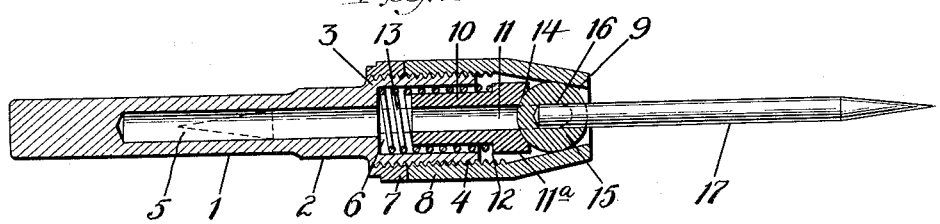
Figure 3:
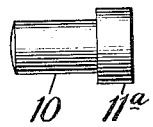
Figure 4:
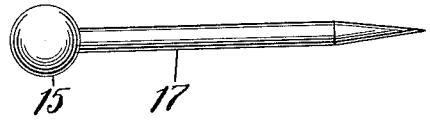
Figure 5:
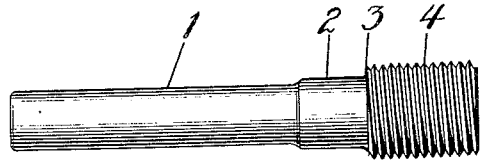

Figure 1 is a side elevation of a tool in accordance with this invention; Fig. 2 is a longitudinal sectional view of the same; Fig. 3 is a side elevation of a detached guide; Fig. 4 is a side elevation of the detached needle or indicator, and Fig. 5 is a side elevation of a spindle of the holder.

The device comprises a cylindrical spindle 1 having the outer end thereof provided with collars or enlargements 2 and 3, the collar 3 being exteriorly screw-threaded, as at 4. The spindle 1 has a longitudinal bore 5 extending from the outer end thereof to a point in close proximity to the inner end of said spindle. The outer end of the bore 5 is enlarged, within the collar 3, to provide a socket 6.

Screwed upon the threaded collar 3 is a metal lock or jam-nut 7 and a spindle sleeve 8, said sleeve having the outer end thereof contracted or tapered to provide an annular beveled seat 9 that has its walls inclined toward the outer end of said sleeve and the longitudinal axis of the device.

Extending into the socket 6 of the spindle is a tubular guide 10 having a bore 11 longitudinally alining with the bore 5 of the spindle, said bore having substantially the same diameter as the bore 5. The outer end of the tubular guide 10 has a head 11ª providing an annular shoulder 12 and engaging said shoulder is the outer convolution of a coiled compression spring 13 arranged within the socket 6 and encircling the inner end of the guide 10. The outer end of the head 11ª has a concaved seat 14 for a spherical body or ball 15 that also engages the seat 9 of the sleeve 8. The spherical body 15 has a socket 16 and mounted in said socket is the inner end of a needle or indicator 17. In some instances, the needle or indicator can be formed integral with the spherical body or ball 15.

The tension of the spring 13 holds the tubular guide 10 against the spherical body 15 and said body frictionally against the seat 9. The tension of the spring 13 can be increased by adjusting the sleeve 8, in which instance, the spherical body 15 is forced inwardly and the guide 10 forced farther into the socket 6, thereby placing the spring 13 under greater tension. With the needle or indicator 17 frictionally held, it is possible to swing the same out of alinement with the longitudinal axis of the device, such position being indicated by dotted lines in Fig. 1.

After a circle has been described upon a piece of work, the sleeve 8 can be unscrewed and the needle indicator removed and a drill substituted therefor.

From the foregoing it will be observed that after the end of the needle is placed in the center mark of an improperly positioned piece of work that said needle will wiggle and thereby indicate that the piece of work is off center and must be trued up before drilling.

It is thought that the utility of the combined milling machine wiggler and drill holder will be apparent without further description, and while one embodiment of my invention has been illustrated, it is to be understood that the structural elements are susceptible to such variations and modifications as fall within the scope of the appended claims.

What I claim as my invention is:—

1. A milling machine wiggler, comprising a spindle having a longitudinal bore formed therein terminating in a socket in the outer end of said spindle, a sleeve screwed upon the outer end of said spindle and provided with a contracted end, an invertible needle capable of being housed in the longitudinal bore of said spindle and having a spherical body detachably seated in the contracted end of said sleeve, and tension means arranged within the socket of said spindle and engaging the spherical body of said needle for frictionally holding said needle in an adjusted position.

2. A milling machine wiggler comprising a spindle having the outer end thereof provided with a socket, a sleeve adjustably mounted upon the outer end of said spindle and provided with a contracted end, a needle having the inner end thereof frictionally held in the contracted end of said sleeve, a guide engaging the inner end of said needle and extending into the socket of said spindle, and means encircling said guide arranged within said socket and engaging the said guide for holding said guide normally in engagement with the inner end of said needle.

3. A milling machine wiggler comprising a spindle having the outer end thereof provided with a socket, a sleeve adjustably mounted upon the outer end of said spindle, a needle having the inner end thereof detachably seated in said sleeve, a tubular spring encircled guide detachably mounted in the socket of said spindle for frictionally engaging and holding the inner end of said needle in engagement with said sleeve.

4. A milling machine wiggler comprising a spindle having the outer end thereof provided with a socket, a sleeve screwed upon the outer end of said spindle and provided with a contracted end, a nut screwed upon said spindle against said sleeve, a needle having the inner end thereof seated in the contracted end of said sleeve, a tubular guide arranged in the socket of said spindle and said sleeve for engaging the inner end of said needle, and means interposed between said guide and said spindle for holding said guide normally in engagement with the inner end of said needle.

5. A milling machine wiggler comprising a spindle having a longitudinal bore terminating in a socket at the outer end of said spindle, a sleeve screwed upon the outer end of said spindle, and having a contracted outer end, a needle having the inner end thereof seated in the contracted end of said sleeve, a guide arranged in said sleeve against the inner end of said needle, said guide having a bore longitudinally alining with the bore of said spindle and coöperating therewith to receive said needle when inserted and housed by said spindle and said sleeve, and means arranged in the socket of said spindle and adapted to hold said guide normally in engagement with the inner end of said needle.

In testimony whereof I affix my signature in presence of two witnesses.

ROBERT COOPER.

Witnesses:
ANNA M. DORR,
E. R. BARRETT.